(12) United States Patent
Gregory

(10) Patent No.: US 12,509,888 B2
(45) Date of Patent: Dec. 30, 2025

(54) JOINT COMPOUND APPLICATION ASSEMBLY

(71) Applicant: Christopher Gregory, Okotoks (CA)

(72) Inventor: Christopher Gregory, Okotoks (CA)

( * ) Notice: Subject to any disclaimer, the term of this patent is extended or adjusted under 35 U.S.C. 154(b) by 299 days.

(21) Appl. No.: 18/382,488

(22) Filed: Oct. 21, 2023

(65) Prior Publication Data

US 2025/0129619 A1  Apr. 24, 2025

(51) Int. Cl.
*E04F 21/165* (2006.01)
*B05C 17/02* (2006.01)
*B62B 3/00* (2006.01)
*B62B 3/10* (2006.01)

(52) U.S. Cl.
CPC ...... *E04F 21/1652* (2013.01); *B05C 17/0245* (2013.01); *B62B 3/005* (2013.01)

(58) Field of Classification Search
CPC ............... E04F 21/1652; E04F 21/165; B05C 17/0245; B05C 17/02; B62B 3/005; B62B 3/002; B62B 3/007; B62B 3/10
See application file for complete search history.

(56) References Cited

U.S. PATENT DOCUMENTS

| | | | |
|---|---|---|---|
| 4,197,338 A | | 4/1980 | Perna |
| 4,325,323 A | * | 4/1982 | Rioux ..................... B44D 3/126 401/15 |
| 5,190,303 A | * | 3/1993 | Schumacher ............ B44D 3/00 108/14 |
| 5,401,231 A | | 3/1995 | Hebert |
| 5,498,120 A | * | 3/1996 | Adams .................. E21B 21/065 414/288 |
| 7,845,656 B2 | * | 12/2010 | Thompson ............... B25H 3/00 280/47.35 |
| 9,073,386 B1 | * | 7/2015 | Bar Shlomo .......... B44D 3/126 |
| 9,677,289 B2 | | 6/2017 | Simek |
| D814,802 S | | 4/2018 | Arvinte |
| D884,300 S | | 5/2020 | Wang |
| 2003/0211922 A1 | | 11/2003 | Piccolo |
| 2009/0302563 A1 | * | 12/2009 | Thibault ................. B62B 3/104 280/727 |
| 2010/0014908 A1 | | 1/2010 | Campbell |
| 2021/0180338 A1 | | 6/2021 | Shepley |
| 2022/0363301 A1 | * | 11/2022 | Sholeen ................. B44D 3/04 |

FOREIGN PATENT DOCUMENTS

GB 2356376 5/2001

* cited by examiner

Primary Examiner — John D Walters

(57) ABSTRACT

A joint compound application assembly for evenly applying joint compound to drywall includes a cart and a box disposed on the cart. A pan is positionable in the box thereby facilitating the box to restrain the pan and the pan can contain joint compound. A roller mount has a first engagement element fixed to the roller mount and a second engagement element movably attached to the roller mount. The second engagement element is positionable in an engaging position or a disengaging position. A pair of rollers is provided and a respective one of the pair of rollers is rotatably attachable to the first engagement element and the second engagement element. In this way the respective roller can apply the joint compound to a wall.

12 Claims, 9 Drawing Sheets

JOINT COMPOUND APPLICATION ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to joint compound devices and more particularly pertains to a new joint compound device for evenly applying joint compound to drywall. The device includes a cart, a box attached to the cart and a pan which contains joint compound and which is positionable in the box to restrain the pan. The device includes a roller mount that has a fixed first engagement element and a pivotable second engagement element. The device includes a pair of rollers and a respective one of the rollers is removably attachable to the first engagement element and the second engagement element to facilitate the respective roller to apply the joint compound to a wall.

(2) Description of Related Art Including Information Disclosed Under 37 CFR 1.97 and 1.98

The prior art relates to joint compound devices including a variety of joint compound rollers that each has a uniquely structured outer surface for enhancing retaining joint compound on the joint compound rollers and a powered joint compound tool that includes a powered mixer and a hose and an applicator. In no instance does the prior art disclose a joint compound application device that includes a cart and a pan positionable on the cart for containing joint compound and a roller mount and a pair of rollers that are each releasably attachable to the roller mount.

BRIEF SUMMARY OF THE INVENTION

An embodiment of the disclosure meets the needs presented above by generally comprising a cart and a box disposed on the cart. A pan is positionable in the box thereby facilitating the box to restrain the pan and the pan can contain joint compound. A roller mount has a first engagement element fixed to the roller mount and a second engagement element movably attached to the roller mount. The second engagement element is positionable in an engaging position or a disengaging position. A pair of rollers is provided and a respective one of the pair of rollers is rotatably attachable to the first engagement element and the second engagement element. In this way the respective roller can apply the joint compound to a wall.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
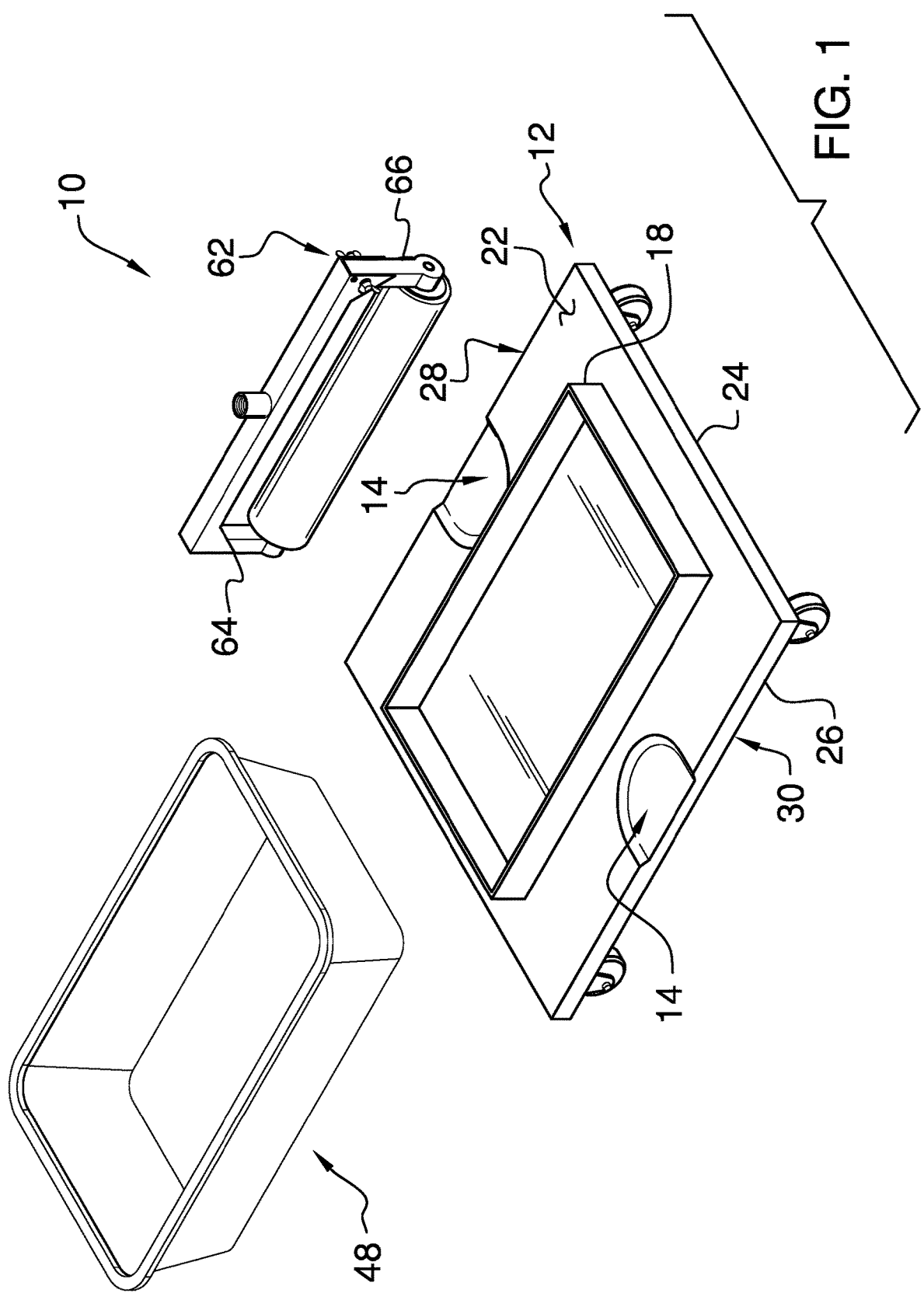
FIG. 1 is a top perspective view of a joint compound application assembly according to an embodiment of the disclosure.
Figure 2:
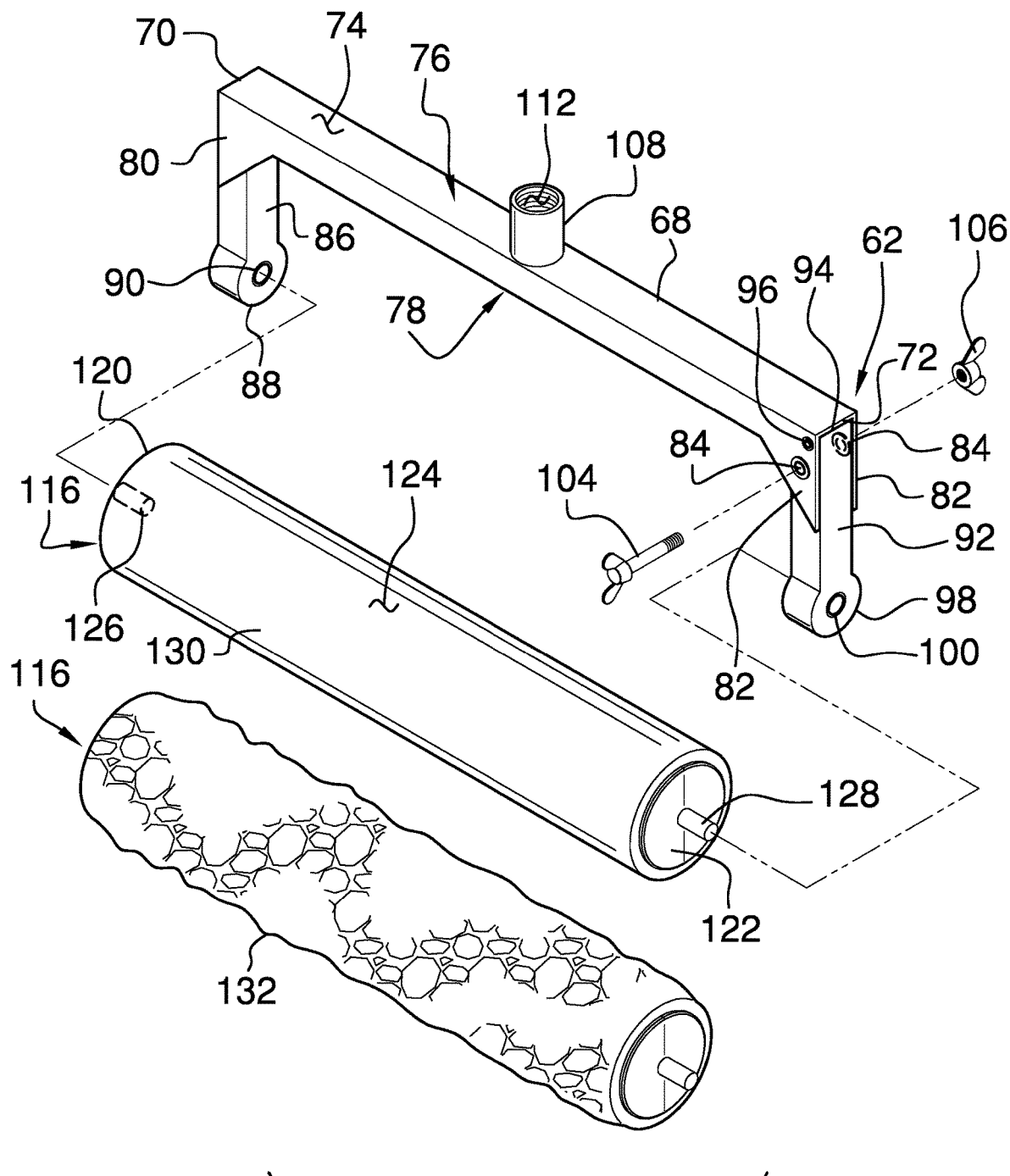
FIG. 2 is an exploded view of a roller mount and a pair of rollers of an embodiment of the disclosure.
Figure 3:
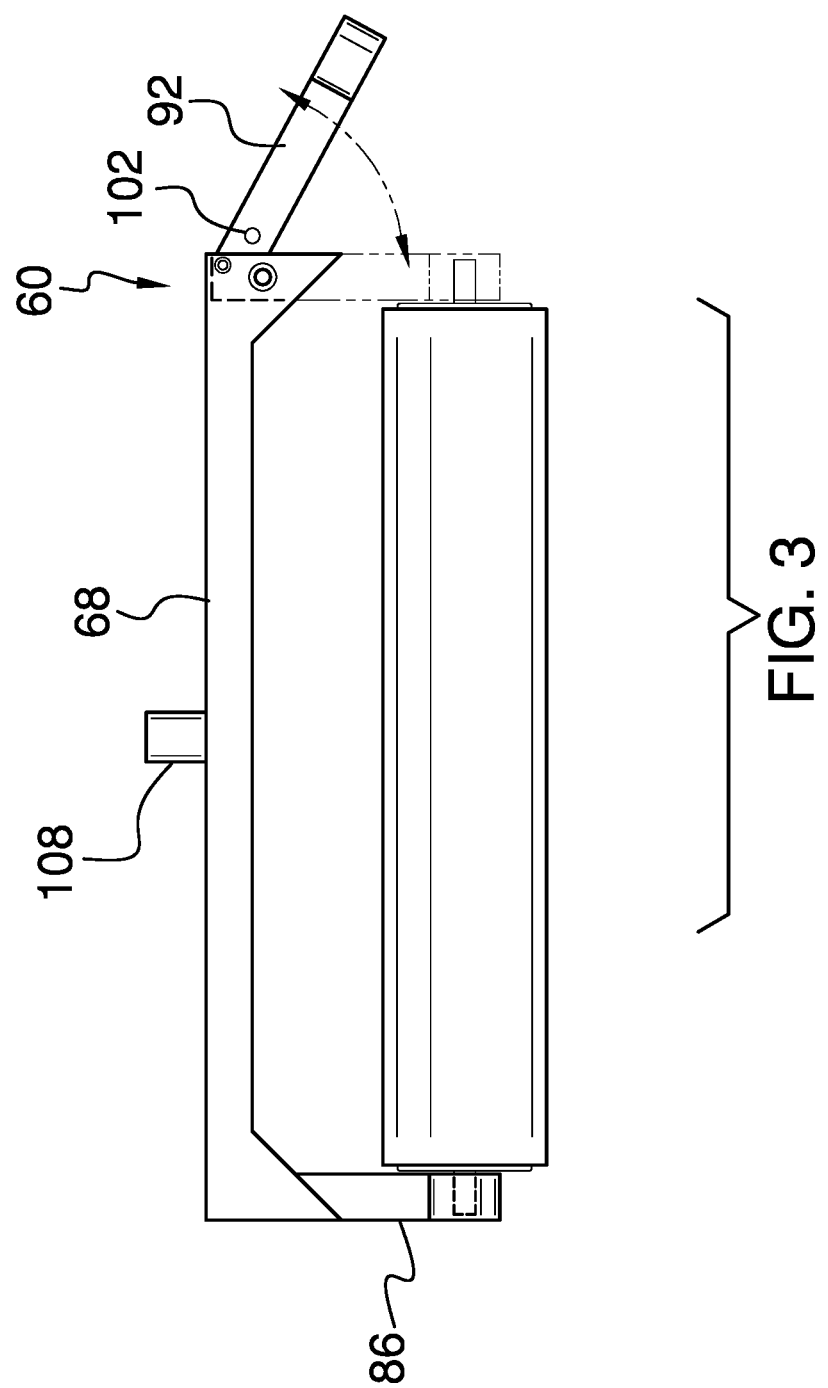
FIG. 3 is a front view of a roller mount and a first roller of an embodiment of the disclosure.
Figure 4:
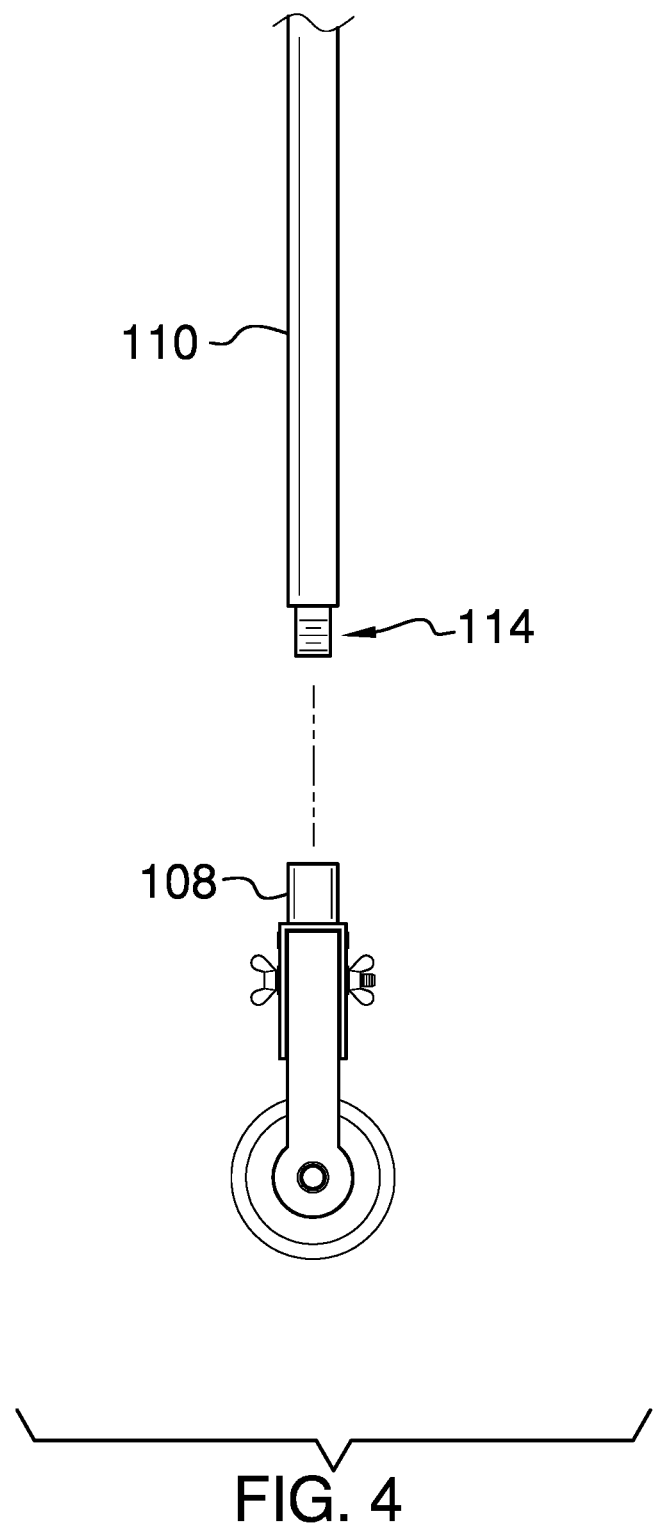
FIG. 4 is an exploded view of a pole and a roller mount of an embodiment of the disclosure.
Figure 5:
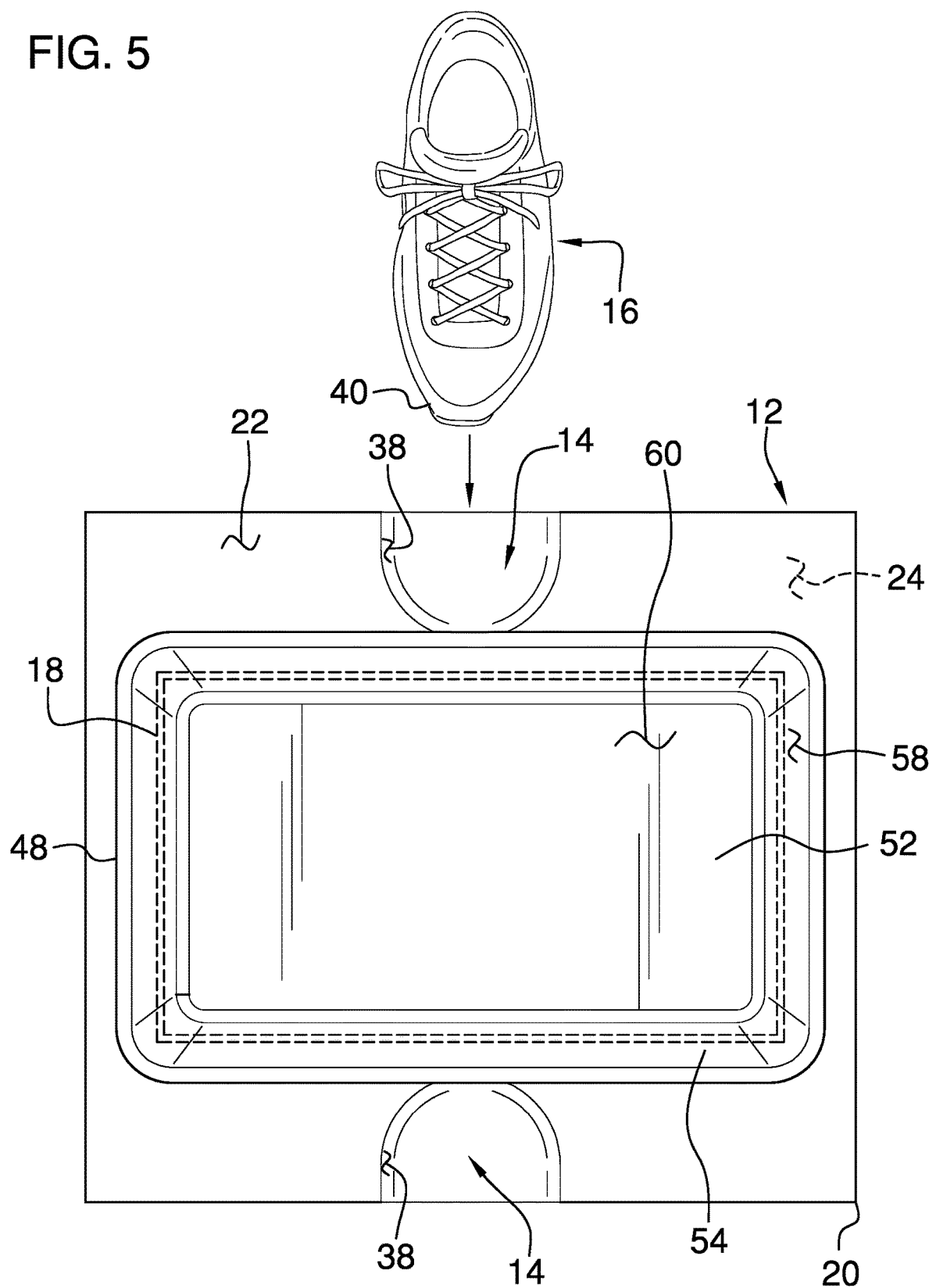
FIG. 5 is a top phantom view of a pan and a cart of an embodiment of the disclosure.
Figure 6:
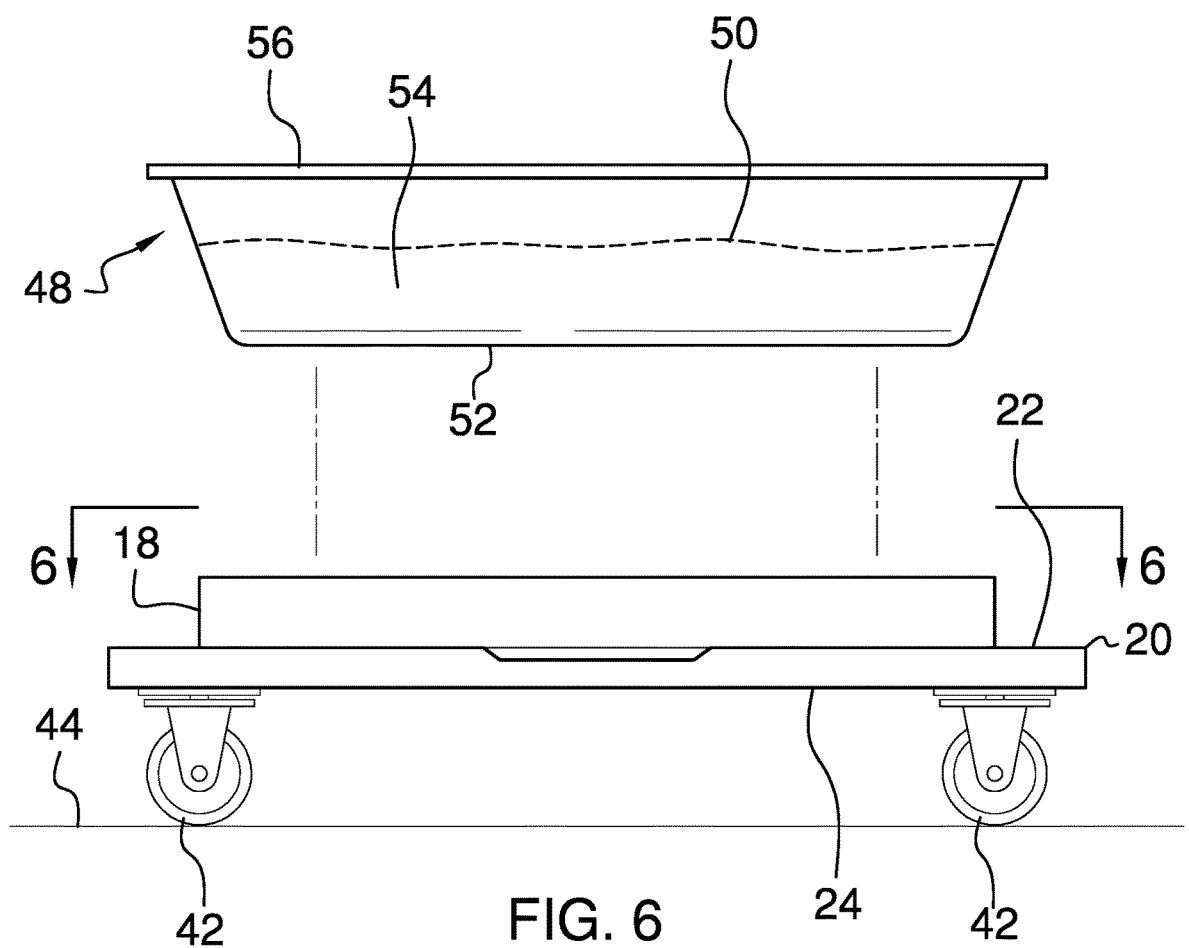
FIG. 6 is a right side exploded view of a pan and a cart of an embodiment of the disclosure.
Figure 7:
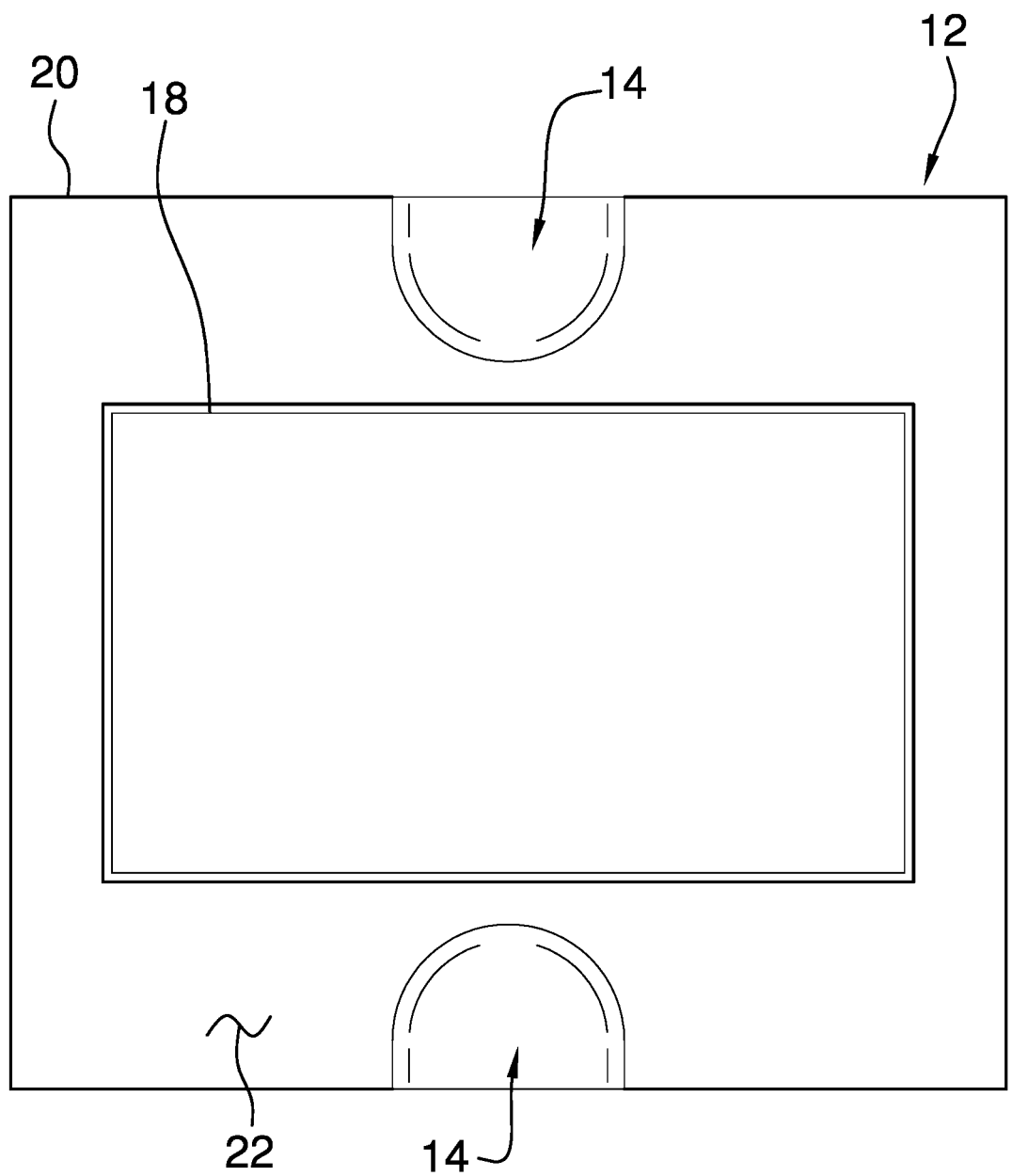
FIG. 7 is a top view of a cart of an embodiment of the disclosure.
Figure 8:
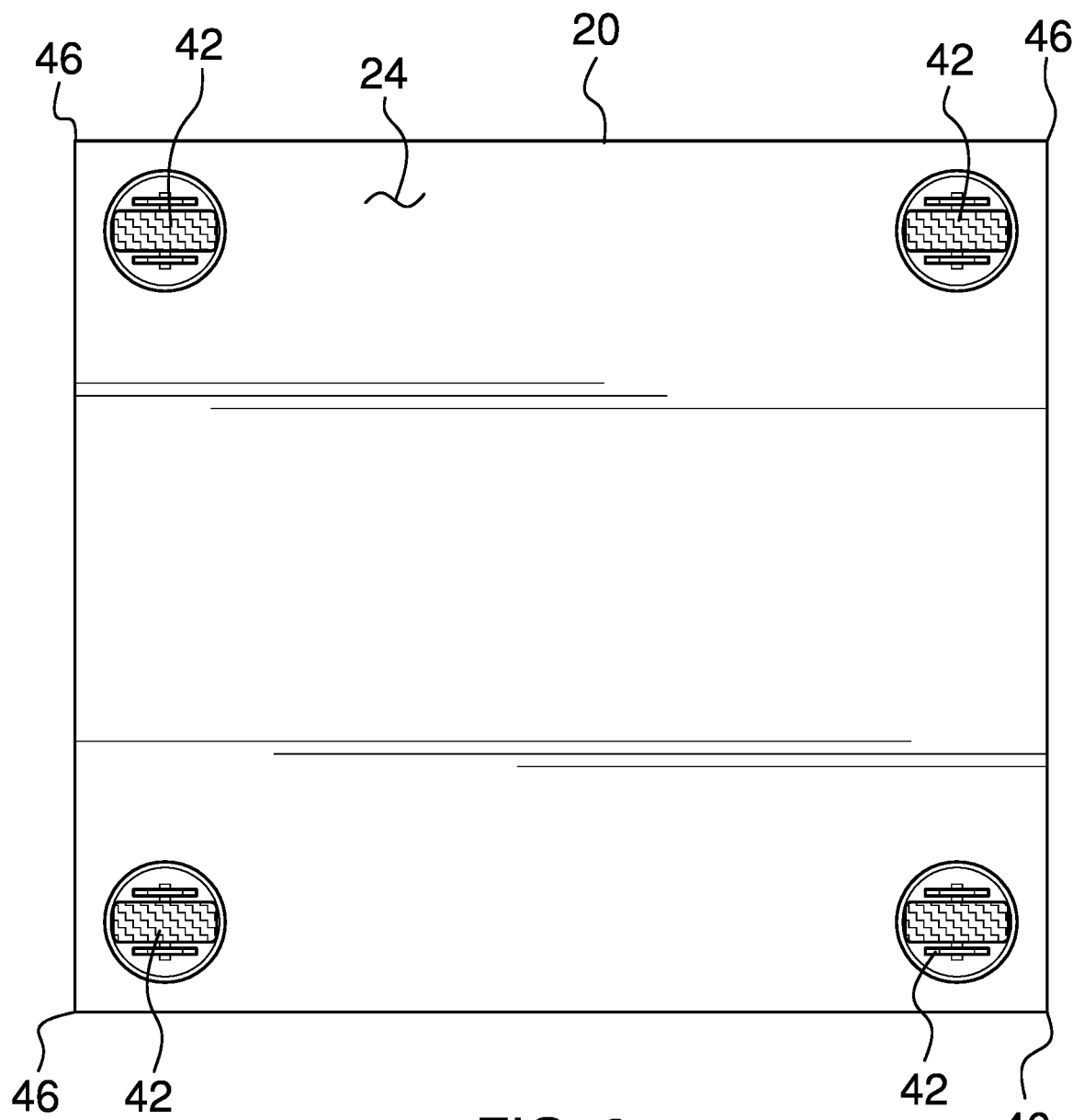
FIG. 8 is a bottom view of a cart of an embodiment of the disclosure.
Figure 9:
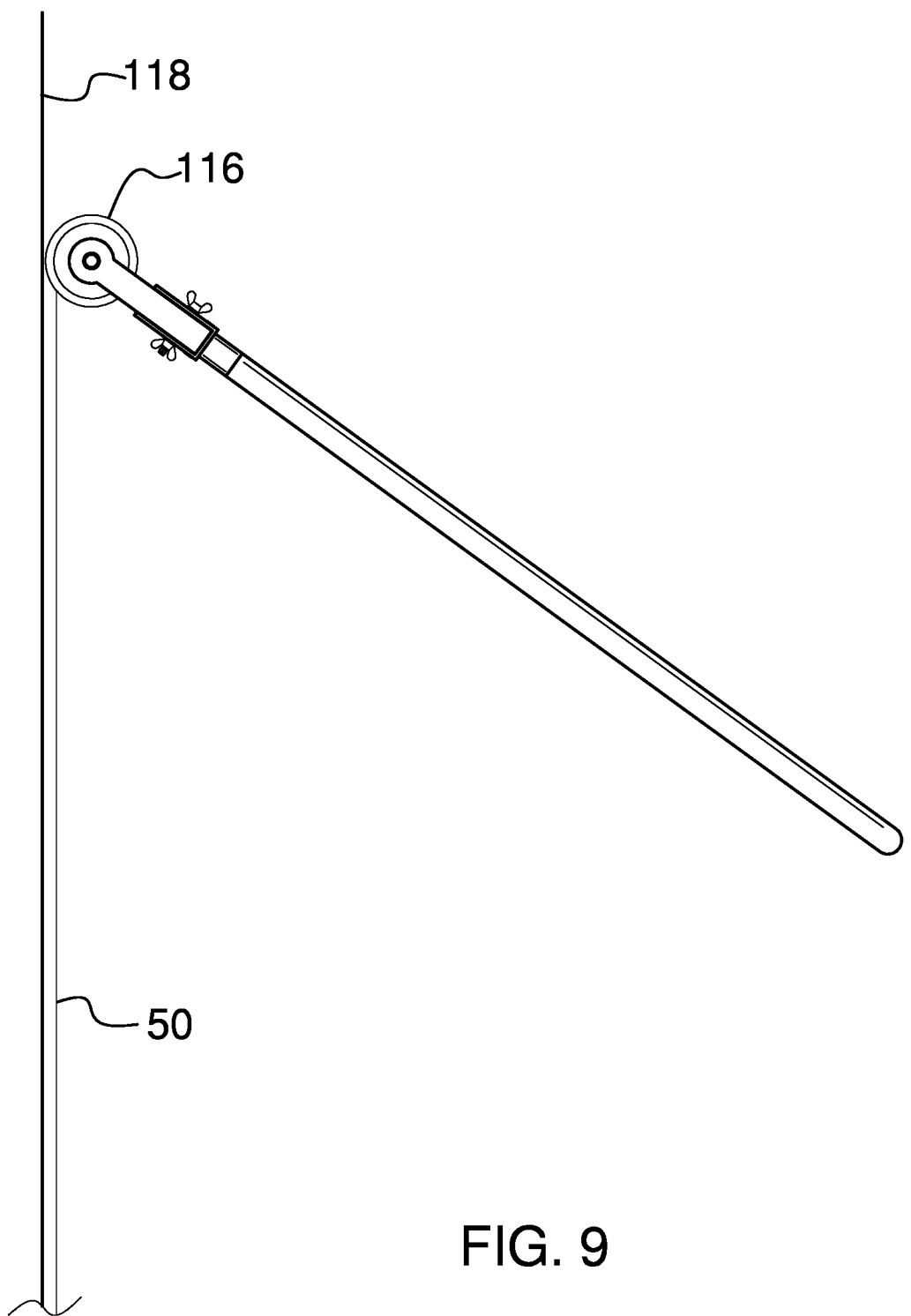
FIG. 9 is a perspective in-use view of an embodiment of the disclosure.

With reference now to the drawings, and in particular to FIGS. 1 through 9 thereof, a new joint compound device embodying the principles and concepts of an embodiment of the disclosure and generally designated by the reference numeral 10 will be described.

As best illustrated in FIGS. 1 through 9, the joint compound application assembly 10 generally comprises a cart 12 that has a pair of foot depressions 14 each integrated into the cart 12 to accommodate a user's foot 16 to stabilize the cart 12 and the cart 12 includes a box 18 that is disposed on the cart 12. The cart 12 comprises a panel 20 that has a top surface 22, a bottom surface 24 and a perimeter edge 26 extending between the top surface 22 and the bottom surface 24; the perimeter edge 26 has a first lateral side 28 and a second lateral side 30. The box 18 has a bottom wall 32 which is attached to the top surface 22 and the box 18 is centrally positioned on the panel 20.

Each of the foot depressions 14 extends into the top surface 22 and each of the foot depressions 14 extends from a respective one of the first lateral side 28 and the second lateral side 30 toward the box 18. Furthermore, each of the foot depressions 14 is centrally positioned between a front side 34 and a back side 36 of the perimeter edge 26. Each of the foot depressions 14 has a bounding surface 38 and the bounding surface 38 is curved to form an arc with the respective first lateral side 28 and the second lateral side 30. In this way each of the pair of foot depressions 14 can conform to curvature of a toe 40 of the user's footwear.

The cart 12 includes a plurality of casters 42 that is each of the casters 42 is rotatably disposed on the bottom surface 24 of the panel 20 to roll along a support surface 44. Each of the plurality of casters 42 is aligned with a respective one of four corners 46 of the panel 20. A pan 48 is provided which is positionable in the box 18 thereby facilitating the box 18 to restrain the pan 48. The pan 48 is comprised of a fluid impermeable material to facilitate the pan 48 to contain joint compound 50. Additionally, the pan 48 is comprised of a rigid material to resist being deformed by the weight of the joint compound 50. The joint compound 50 may comprise a fluid joint compound that is commonly employed for finishing drywall 118.

The pan 48 has a lower wall 52 and a perimeter wall 54 extending upwardly from the lower wall 52. The perimeter wall 54 slopes outwardly from the lower wall 52 such that an opening defined by a top edge 56 of the perimeter wall 54 has a length and a width that is greater than a length and a width of the lower wall 52. The lower wall 52 rests upon the bottom wall 32 of the box 18 when the pan 48 is placed in the box 18. Additionally, an inside surface 58 of the perimeter wall 54 intersects an upper surface 60 of the lower wall 52 at a curve. In this way the pan 48 facilitates a mud knife to scrape the joint compound 50 out of the pan 48 without encountering structural prominences or crevices in the pan 48.

A roller mount 62 is provided which has a first engagement element 64 that is fixed to the roller mount 62 and a second engagement element 66 that is movably attached to the roller mount 62. The second engagement element 66 is positionable in an engaging position having the second engagement element 66 being aligned with the first engagement element 64. The second engagement element 66 is positionable in a disengaging position having the second engagement element 66 being displaced from the first engagement element 64. The roller mount 62 comprises a first member 68 which has a first end 70, a second end 72 and an outer surface 74 extending between the first end 70 and the second end 72. The outer surface 74 has a top side 76 and a bottom side 78 and the first member 68 is elongated between the first end 70 and the second end 72.

The first member 68 has a pair of first gussets 80 each extending downwardly from the bottom side 78. Each of the pair of first gussets 80 is aligned with the first end 70 and the first gussets 80 are spaced apart from each other. The first member 68 has a pair of second gussets 82 each extending downwardly from the bottom side 78. Each of the pair of second gussets 82 is aligned with the second end 72 and the pair of second gussets 82 is spaced apart from each other. Each of the pair of second gussets 82 has a screw aperture 84 extending through a respective second gusset 82.

The roller mount 62 includes a second member 86 that is attached to and extends downwardly from the bottom side 78 of the outer surface 74 of the first member 68. The second member 86 is aligned with the first end 70 of the first member 68 such that the second member 86 is positioned between the pair of first gussets 80. The second member 86 is rounded adjacent to a distal end 88 of the second member 86 such that the second member 86 has a circular profile at the distal end 88. The second member 86 has an opening 90 extending through the second member 86 such that the second member 86 and the opening 90 defines the first engagement element 64. The second member 86 is oriented such that an axis extending through the opening 90 is oriented parallel with an axis extending between the first end 70 and the second end 72 of the first member 68. Additionally, the opening 90 forms a circle which is concentric with the circular profile of the second member 86.

The roller mount 62 includes a third member 92 which has an upper end 94 that is pivotally attached to a pivot point 96 associated with each of the pair of second gussets 82 such that the third member 92 is aligned with the second end 72 of the first member 68. The third member 92 is rounded adjacent to a bottom end 98 of the third member 92 such that the third member 92 has a circular profile at the bottom end 98. The third member 92 has an opening 100 extending through the third member 92 such that the third member 92 and the opening 100 associated with the third member 92 defies the second engagement element 66. The opening 100 associated with the third member 92 is concentric with the circular profile of the third member 92.

The third member 92 has a screw hole 102 extending laterally through the third member 92 and the screw hole 102 is aligned with the screw aperture 84 in each of the second gussets 82 when the first member 68 is in a first position. The third member 92 is oriented such that an axis extending through the opening 100 associated with the third member 92 is oriented parallel with an axis extending between the first end 70 and the second end 72 of the first member 68 when the third member 92 is in the first position. Conversely, the third member 92 is pivotable into a second position having the third member 92 angling away from the second member 86. A screw 104 is insertable through the screw aperture 84 in each of the pair of second gussets 82 and the screw hole 102 in the third member 92 when the third member 92 is in the first position for retaining the third member 92 in the first position. The screw 104 is threaded on one end and a nut 106 is provided that can be threaded onto the screw 104 when the screw 104 is extended through the screw aperture 84 in each of the pair of second gussets 82 and the screw hole 102 in the third member 92.

The roller mount 62 includes a cup 108 that is coupled to and extends upwardly from the top side 76 of the outer surface 74 of the first member 68 such that the cup 108 can insertably receive a pole 110. The cup 108 is centrally positioned between the first end 70 and the second end 72. Additionally, the cup 108 has an interior surface 112 which is threaded to threadably engage threading 114 on the pole 110 for attaching the cup 108 to the pole 110. The pole 110 may a pole for a paint roller or any other type of pole that is threaded for painting tools.

A pair of rollers 116 is provided and a respective one of the pair of rollers 116 is rotatably attachable to the first engagement element 64 and the second engagement element 66 to apply the joint compound 50 to a wall 118. Each of the pair of rollers 116 has a primary end 120, a secondary end 122 and an exterior surface 124 extending between the primary end 120 and the secondary end 122. Each of the pair of rollers 116 has a first peg 126 extending away from the primary end 120 and each of the pair of rollers 116 has a second peg 128 extending away from the secondary end 122. The first peg 126 associated with a respective one of the pair of rollers 116 is extendable through the opening 90 associated with the second member 86 of the roller mount 62.

The second peg 128 associated with the respective roller 116 is extendable through the opening 100 associated with the third member 92 of the roller mount 62 when the third member 92 is in the first position. Conversely, the second peg 128 associated with the respective roller 116 is removed from the opening 100 associated with the third member 92 when the third member 92 is in the second position thereby facilitating the respective roller 116 to be removed from the roller mount 62. Each of the pair of rollers 116 may have a diameter of ranging between approximately 10.0 cm and 15.0 cm and a length ranging between approximately 50.0 cm and 60.0 cm. The pair of rollers 116 includes a first roller 130 and a second roller 132. The exterior surface 124 of the first roller 130 comprises a smooth material to apply the joint compound 50 to the wall 118 in a smooth manner. The exterior surface 124 of the second roller 132 comprises a textured material to apply the joint compound 50 to the wall 118 in a smooth manner.

In use, the pan 48 is positioned in the box 18 and the joint compound 50 is poured into the pan 48. Either the first roller 130 or the second roller 132, depending on the user's preference, is attached to the roller mount 62 and the pole 110 is attached to the roller mount 62. The first roller 130 or the second roller 132 is dipped into the joint compound 50 to cover the first roller 130 or the second roller 132 with the joint compound 50. In this way the first roller 130 or the second roller 132 can be rolled upwardly and downwardly along the wall 118 to apply the joint compound 50 in an even layer on the drywall 118. The first roller 130 is employed to apply the joint compound 50 with a smooth finish that requires no wiping with a trowel. Thus, the joint compound 50 will require no wiping when the joint compound 50 has dried thereby reducing the total amount of time required to tape and texture the drywall 118. The second roller 132 is employed when the joint compound 50 needs to be applied in a very thick and heavy layer that will require wiping with a trowel.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A joint compound application assembly for applying joint compound to drywall in a smooth and uniform layer thereby reducing subsequent wiping and finish work, said assembly comprising:
    a cart having a pair of foot depressions each being integrated into said cart wherein each of said foot depressions is configured to accommodate a user's foot to stabilize said cart, said cart including a box being disposed on said cart;
    a pan being positionable in said box thereby facilitating said box to restrain said pan, said pan being comprised of a fluid impermeable material wherein said pan is configured to contain joint compound, said pan being comprised of a rigid material wherein said pan is configured to resist being deformed by the weight of the joint compound;
    a roller mount having a first engagement element being fixed to said roller mount and a second engagement element being movably attached to said roller mount, said second engagement element being positionable in an engaging position having said second engagement element being aligned with said first engagement element, said second engagement element being positionable in a disengaging position having said second engagement element being displaced from said first engagement element; and
    a pair of rollers, a respective one of said pair of rollers being rotatably attachable to said first engagement element and said second engagement element wherein said respective roller is configured to apply the joint compound to a wall.

2. The assembly according to claim 1, wherein said cart comprises:
    a panel having a top surface and a bottom surface and a perimeter edge extending between said top surface and said bottom surface, said perimeter edge having a first lateral side and a second lateral side, said box having a bottom wall being attached to said top surface, said box being centrally positioned on said panel, each of said foot depressions extending into said top surface, each of said foot depressions extending from a respective one of said first lateral side and said second lateral side toward said box, each of said foot depressions being centrally positioned between a front side and a back side of said perimeter edge, each of said foot depressions having a bounding surface, said bounding surface being curved to form an arc with said respective first lateral side and said second lateral side wherein each of said pair of foot depressions is configured to conform to curvature of a toe of the user's footwear; and
    a plurality of casters, each of said casters being rotatably disposed on said bottom surface of said panel wherein each of said plurality of casters is configured to roll along a support surface, each of said plurality of casters being aligned with a respective one of four corners of said panel.

3. The assembly according to claim 2, wherein:
    said pan has a lower wall and a perimeter wall extending upwardly from said lower wall, said perimeter wall sloping outwardly from said lower wall such that an opening defined by a top edge of said perimeter wall has a length and a width being greater than a length and a width of said lower wall;
    said lower wall rests upon a bottom wall of said box when said pan is placed in said box; and
    an inside surface of said perimeter wall intersects an upper surface of said lower wall at a curve wherein said pan is configured to facilitate a mud knife to scrape the joint compound out of said pan without encountering structural prominences or crevices in said pan.

4. The assembly according to claim 1, wherein:
said roller mount comprises a first member having a first end and a second end an outer surface extending between said first end and said second end, said outer surface having a top side and a bottom side, said first member being elongated between said first end and said second end;
said first member has a pair of first gussets each extending downwardly from said bottom side, each of said pair of first gussets being aligned with said first end, said pair of first gussets being spaced apart from each other;
said first member has a pair of second gussets each extending downwardly from said bottom side, each of said pair of second gussets being aligned with said second end, said pair of second gussets being spaced apart from each other; and
each of said pair of second gussets has a screw aperture extending through a respective second gusset.

5. The assembly according to claim 4, wherein said roller mount includes a cup being coupled to and extending upwardly from said top side of said outer surface of said first member wherein said cup is configured to insertably receive a pole, said cup being centrally positioned between said first end and said second end, said cup having an interior surface being threaded wherein said interior surface is configured to threadably engaging threading on the pole for attaching said cup to the pole.

6. The assembly according to claim 4, wherein:
said roller mount includes a second member being attached to and extending downwardly from said bottom side of said outer surface of said first member, said second member being aligned with said first end of said first member such that said second member is positioned between said pair of first gussets;
said second member is rounded adjacent to a distal end of said second member such that said second member has a circular profile at said distal end;
said second member has an opening extending through said second member such that said second member and said opening defines said first engagement element;
said second member is oriented such that said an axis extending through said opening is oriented parallel with an axis extending between said first end and said second end of said first member; and
said opening forms a circle being concentric with said circular profile of said second member.

7. The assembly according to claim 6, wherein:
said roller mount includes a third member having an upper end being pivotally attached to a pivot point associated with each of said pair of second gussets such that said third member is aligned with said second end of said first member;
said third member is rounded adjacent to a bottom end of said third member such that said third member has a circular profile at said bottom end;
said third member has an opening extending through said third member such that said third member and said opening associated with said third member defies said second engagement element; and
said opening associated with said third member is concentric with said circular profile of said third member, said third member having a screw hole extending laterally through said third member.

8. The assembly according to claim 7, wherein:
said screw hole is aligned with said screw aperture in each of said second gussets when said first member is in a first position, said third member being oriented such that an axis extending through said opening associated with said third member is oriented parallel with an axis extending between said first end and said second end of said first member when said third member is in said first position; and
said third member is pivotable into a second position having said third member angling away from said second member.

9. The assembly according to claim 8, further comprising a screw being insertable through said screw aperture in each of said pair of second gussets and said screw hole in said third member when said third member is in said first position for retaining said third member in said first position.

10. The assembly according to claim 8, wherein:
each of said pair of rollers has a primary end and a secondary end and an exterior surface extending between said primary end and said secondary end;
each of said pair of rollers has a first peg extending away from said primary end;
each of said pair of rollers has a second peg extending away from said secondary end;
said first peg associated with a respective one of said pair of rollers is extendable through said opening associated with said second member of said roller mount;
said second peg associated with said respective roller is extendable through said opening associated with said third member of said roller mount when said third member is in said first position; and
said second peg associated with said respective roller is removed from said opening associated with said third member when said third member is in said second position thereby facilitating said respective roller to be removed from said roller mount.

11. The assembly according to claim 1, wherein:
said pair of rollers includes a first roller and a second roller;
an exterior surface of said first roller comprises a smooth material wherein said first roller is configured to apply the joint compound to the wall in a smooth layer; and
an exterior surface of said second roller comprises a textured material wherein said second roller is configured to apply the joint compound to the wall in a thick and heavy layer.

12. A joint compound application assembly for applying joint compound to drywall in a smooth and uniform layer thereby reducing subsequent wiping and finish work, said assembly comprising:
a cart having a pair of foot depressions each being integrated into said cart wherein each of said foot depressions is configured to accommodate a user's foot to stabilize said cart, said cart including a box being disposed on said cart, said cart comprising:
a panel having a top surface and a bottom surface and a perimeter edge extending between said top surface and said bottom surface, said perimeter edge having a first lateral side and a second lateral side, said box having a bottom wall being attached to said top surface, said box being centrally positioned on said panel, each of said foot depressions extending into said top surface, each of said foot depressions extending from a respective one of said first lateral side and said second lateral side toward said box, each of said foot depressions being centrally positioned between a front side and a back side of said perimeter edge, each of said foot depressions having a bounding surface, said bounding surface being curved to form an arc with said respective first lateral side and said second lateral side wherein each of said pair of foot depressions is configured to conform to curvature of a toe of the user's footwear; and a plurality of casters, each of said casters being rotatably disposed on said bottom surface of said panel wherein each of said plurality of casters is configured to roll along a support surface, each of said plurality of casters being aligned with a respective one of four corners of said panel;

a pan being positionable in said box thereby facilitating said box to restrain said pan, said pan being comprised of a fluid impermeable material wherein said pan is configured to contain joint compound, said pan being comprised of a rigid material wherein said pan is configured to resist being deformed by the weight of the joint compound, said pan having a lower wall and a perimeter wall extending upwardly from said lower wall, said perimeter wall sloping outwardly from said lower wall such that an opening defined by a top edge of said perimeter wall has a length and a width being greater than a length and a width of said lower wall, said lower wall resting upon said bottom wall of said box when said pan is placed in said box, an inside surface of said perimeter wall intersecting an upper surface of said lower wall at a curve wherein said pan is configured to facilitate a mud knife to scrape the joint compound out of said pan without encountering structural prominences or crevices in said pan;

a roller mount having a first engagement element being fixed to said roller mount and a second engagement element being movably attached to said roller mount, said second engagement element being positionable in an engaging position having said second engagement element being aligned with said first engagement element, said second engagement element being positionable in a disengaging position having said second engagement element being displaced from said first engagement element, said roller mount comprising:

a first member having a first end and a second end an outer surface extending between said first end and said second end, said outer surface having a top side and a bottom side, said first member being elongated between said first end and said second end, said first member having a pair of first gussets each extending downwardly from said bottom side, each of said pair of first gussets being aligned with said first end, said pair of first gussets being spaced apart from each other, said first member having a pair of second gussets each extending downwardly from said bottom side, each of said pair of second gussets being aligned with said second end, said pair of second gussets being spaced apart from each other, each of said pair of second gussets having a screw aperture extending through a respective second gusset;

a second member being attached to and extending downwardly from said bottom side of said outer surface of said first member, said second member being aligned with said first end of said first member such that said second member is positioned between said pair of first gussets, said second member being rounded adjacent to a distal end of said second member such that said second member has a circular profile at said distal end, said second member having an opening extending through said second member such that said second member and said opening defines said first engagement element, said second member being oriented such that said an axis extending through said opening is oriented parallel with an axis extending between said first end and said second end of said first member, said opening forming a circle being concentric with said circular profile of said second member;

a third member having an upper end being pivotally attached to a pivot point associated with each of said pair of second gussets such that said third member is aligned with said second end of said first member, said third member being rounded adjacent to a bottom end of said third member such that said third member has a circular profile at said bottom end, said third member having an opening extending through said third member such that said third member and said opening associated with said third member defies said second engagement element, said opening associated with said third member being concentric with said circular profile of said third member, said third member having a screw hole extending laterally through said third member, said screw hole being aligned with said screw aperture in each of said second gussets when said first member is in a first position, said third member being oriented such that an axis extending through said opening associated with said third member is oriented parallel with an axis extending between said first end and said second end of said first member when said third member is in said first position, said third member being pivotable into a second position having said third member angling away from said second member;

a screw being insertable through said screw aperture in each of said pair of second gussets and said screw hole in said third member when said third member is in said first position for retaining said third member in said first position; and a cup being coupled to and extending upwardly from said top side of said outer surface of said first member wherein said cup is configured to insertably receive a pole, said cup being centrally positioned between said first end and said second end, said cup having an interior surface being threaded wherein said interior surface is configured to threadably engaging threading on the pole for attaching said cup to the pole; and a pair of rollers, a respective one of said pair of rollers being rotatably attachable to said first engagement element and said second engagement element wherein said respective roller is configured to apply the joint compound to a wall, each of said pair of rollers having a primary end and a secondary end and an exterior surface extending between said primary end and said secondary end, each of said pair of rollers having a first peg extending away from said primary end, each of said pair of rollers having a second peg extending away from said secondary end, said first peg associated with a respective one of said pair of rollers being extendable through said opening associated with said second member of said roller mount, said second peg associated with said respective roller being extendable through said opening associated with said third member of said roller mount when said third member is in said first position, said second peg associated with said respective roller being removed from said opening associated with said third member when said third member is in said second position thereby facilitating said respective roller to be removed from said roller mount, said pair of rollers including a first roller and a second roller, said exterior surface of said first roller comprising a smooth material wherein said first roller is configured to apply the joint compound to the wall in a smooth layer, said exterior surface of said second roller comprising a textured material wherein said second roller is configured to apply the joint compound to the wall in a thick and heavy layer.

* * * * *